March 3, 1970　　　R. P. RICKEY　　　3,498,131
LIQUID LEVEL MEASURING OR INDICATING DEVICE
Filed Aug. 29, 1967　　　2 Sheets-Sheet 1

INVENTOR
RONALD P. RICKEY
BY
EDWARD D. O'BRIAN
ATTORNEY

March 3, 1970  R. P. RICKEY  3,498,131
LIQUID LEVEL MEASURING OR INDICATING DEVICE
Filed Aug. 29, 1967  2 Sheets-Sheet 2
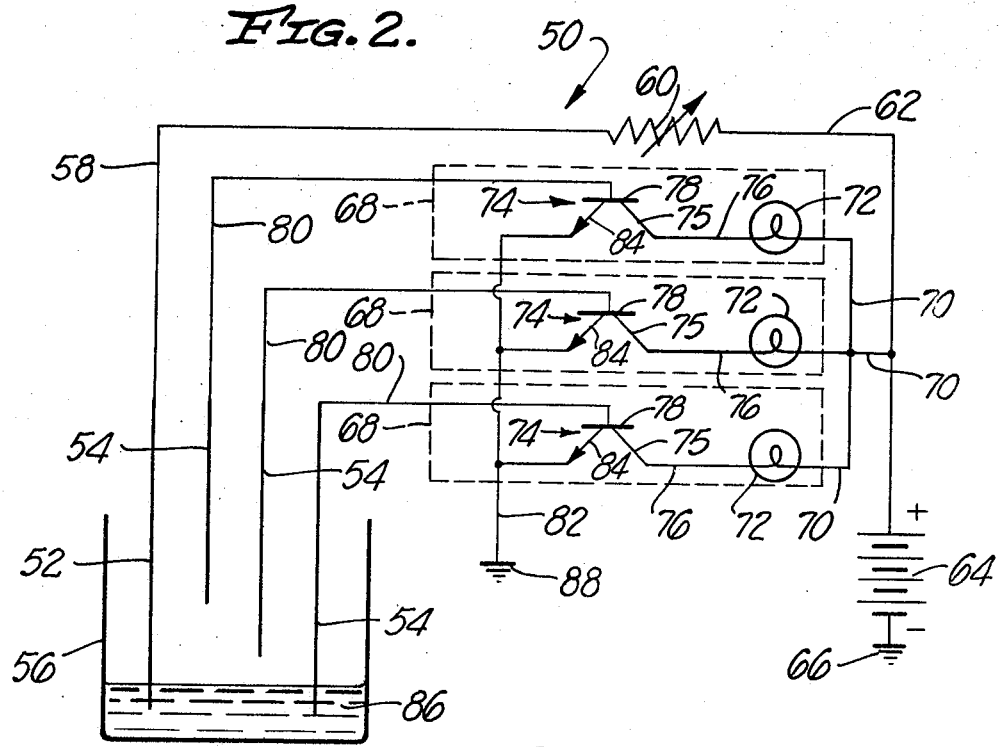
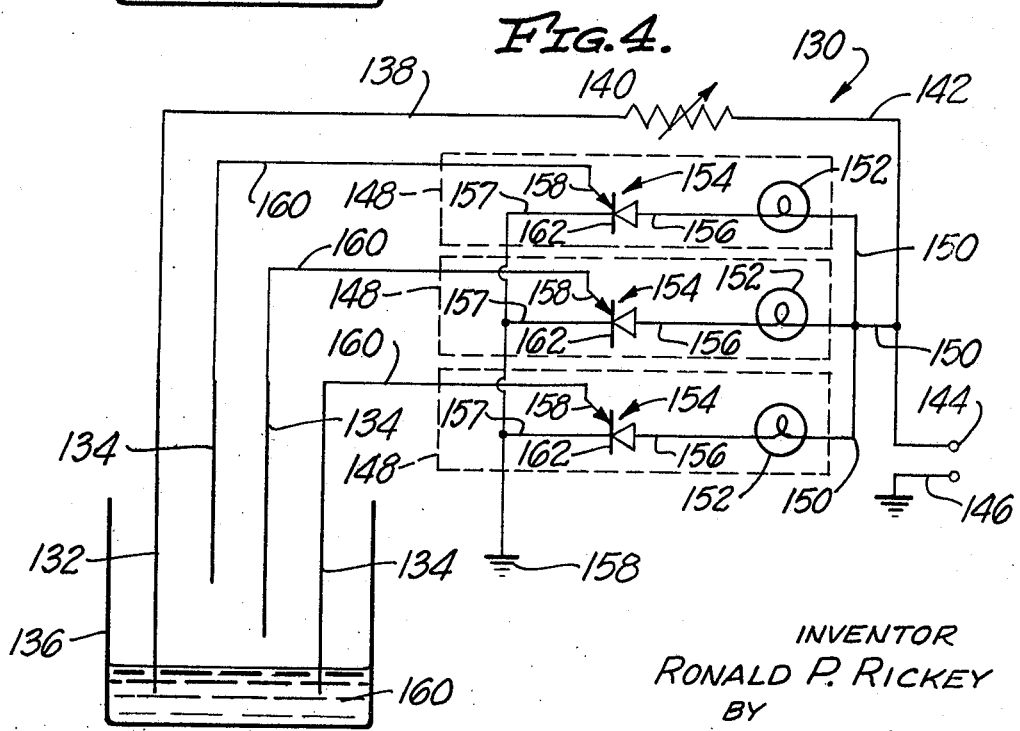
INVENTOR
RONALD P. RICKEY
BY
EDWARD D. O'BRIAN
ATTORNEY United States Patent Office 3,498,131
Patented Mar. 3, 1970

3,498,131
LIQUID LEVEL MEASURING OR
INDICATING DEVICE
Ronald P. Rickey, Orange, Calif., assignor to Eltop Corp.,
Orange, Calif., a corporation of California
Filed Aug. 29, 1967, Ser. No. 670,493
Int. Cl. G01f 23/00
U.S. Cl. 73—304                            1 Claim

ABSTRACT OF THE DISCLOSURE

A liquid level responsive device having immersible primary and common electrodes. The amount of liquid varies the resistance between the electrodes. An indicator circuit including a transistor responds to changes in liquid level. The amount of liquid in the tank displayed by either an ammeter or light bulbs.

BACKGROUND OF THE INVENTION

Frequently it is necessary and/or desirable to obtain a measurement of or an indication of the level of a liquid at a distance from the liquid itself. Many different devices have been developed for this purpose. Some of such devices have been purely mechanical in nature. Other of such devices have incorporated both mechanical and electrical or electronic features, and some of such devices have been purely electrical and/or electronic in character.

In many applications mechanical devices for obtaining the measurement of or indication of the level of a liquid at a distance from the liquid are considered to be disadvantageous because of problems such as complexity, reliability, ease of manufacturing, cost, ease of installation and the ease of servicing such devices. Similar factors have frequently influenced the acceptability of such measuring or indicating devices for this purpose which utilize both mechanical and electrical or electronic features. As a result of these factors a number of efforts have been directed to measuring or indicating devices for this purpose which are electrical and/or electronic in character.

It is considered that many individuals have attempted to provide such electrical and electronic devices based upon the utilization of the conductivity of the liquid being measured between two or more electrodes. With this type of structure it has long been realized that when electrical conductivity can be established between the electrodes a reading can be obtained which is indicative of fluid level through the use of an appropriate indicating means. In theory this type of device should work properly and satisfactorily with many liquids, and should be relatively reliable, inexpensive and easy to service.

However, theory frequently differs from practice. As an example of this difficulties have been encountered with measuring devices based on the conductivity of a fluid between two electrodes which are used for the purpose of measuring or indicating the level of common water. In theory water other than distilled or deionized water from virtually any common source will possess sufficient conductivity so as to conduct a current between two closely spaced electrodes. However, it is considered difficult if not impossible to manufacture at a commercially acceptable cost a measuring or indicating device using two or more electrodes in which the electrodes are closely enough spaced so that water from common sources will establish an easily measured electrical conduction between the electrodes.

From this it will be seen that an important factor with respect to a multi-electrode type of device for measuring or indicating liquid level on the basis of conductivity is purely economic. To be commercially acceptable a device of this category must be relatively inexpensive to manufacture. Such a device must also be relatively easy to install, relatively accurate, relatively reliable and in case service is needed, relatively easy to service.

BRIEF SUMMARY OF THE INVENTION

Objects of this invention are to provide multielectrode devices of a type responsive to the presence of an electrically conductive liquid between electrodes which are comparatively inexpensive, which are comparatively easy to manufacture, which are comparatively easy to install, which are relatively accurate, which are relatively reliable and which are relatively easy to service if service is required. Another object of this invention is to provide devices of the type described which are relatively or comparatively "rugged" and which are capable of withstanding a significant amount of physical abuse.

These various objectives of the invention are achieved with liquid level responsive devices, each of which has a primary electrode adapted to be connected to a power source, at least one counter electrode located in proximity to the primary electrode and a circuit section corresponding to each counter electrode, each such circuit section being adapted to be connected to a power source and including in series current responsive or indicator means and a current responsive switch means having a control terminal, the control terminal being connected to the counter electrode which corresponds to the circuit section within which the switch means is located. When only one such counter electrode is used preferably both of the electrodes are of the same physical dimension. When several such counter electrodes are used preferably the counter electrodes are of different physical dimensions.

DESCRIPTION OF THE FIGURES OF THE DRAWINGS

The actual details of the present invention are more fully described with reference to the accompanying drawing in which:

FIG. 2 is a schematic view of a presently preferred embodiment or form of a liquid measuring or indicating device of this invention;

FIG. 4 is a schematic view of still another embodiment or form of a liquid indicating or measuring device of this invention.

DESCRIPTION OF THE ILLUSTRATED EMBODIMENTS

Figure 1:
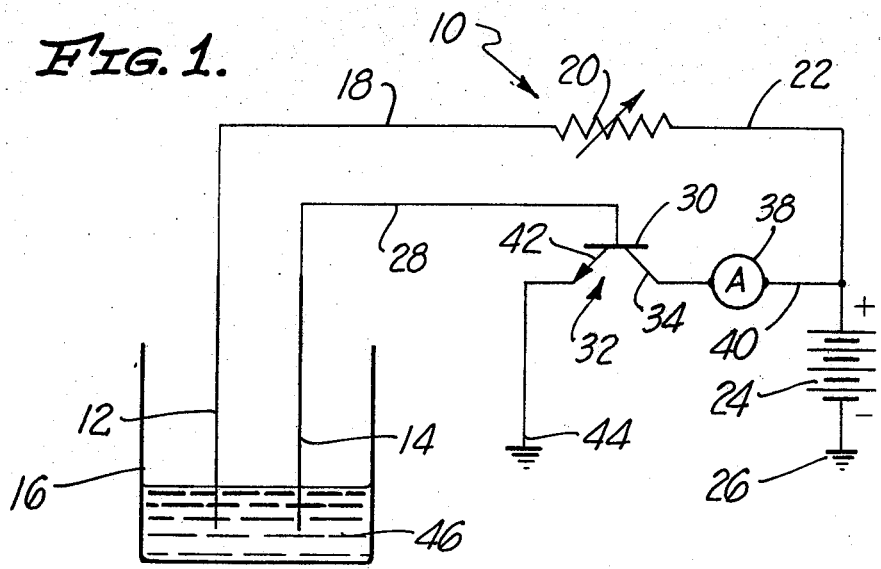
FIG. 1 is a schematic view of one embodiment or form of a liquid measuring or indicating device of this invention.

In FIG. 1 there is shown a simplified measuring device 10 of the present invention which includes a primary electrode 12 and a counter electrode 14. Preferably these electrodes 12 and 14 are constructed out of a material such as an electrically conductive metal which is inserted with respect to a liquid with which the device 10 is ultimately to be used. Metals such as platinum, stainless steel or the like can be used. These two electrodes 12 and 14 may be mounted upon any convenient support (not shown) or may merely be immersed in an appropriate container such as the container 16 illustrated.

The electrode 12 is electrically connected by a line 18 to a variable resistor 20 which is in turn electrically connected by another line 22 to a power source 24 used with the device 10. This resistor 20 may be adjusted as necessary to insure that a proper amount of current flows to the electrode 12 for the entire device 10 to operate properly. This power source 24 is grounded by ground 26; it normally will be a battery as shown. The counter electrode 14 is connected by a line 28 to a control terminal or base 30 of a conventional transistor 32 serving as a current responsive switch.

The input terminal or collector 34 of this transistor 32 is connected to an ammeter 38 serving as an indicator means which is in turn connected by another line 40 to the same power source 24. The other terminal or emitter 42 of the transistor 32 is grounded by a ground 44. If desired this structure including the meter 38, the transistor 32 and the appropriate connections can be considered as a "circuit section." Although it is not normally desired a separate power source (not shown) may be used instead of the power source 24 to supply a current to the ammeter 38 and the input terminal or collector 34 of the transistor 32.

When the device 10 is connected as shown no current will pass between the electrodes 12 and 14 as long as the container 16 is empty. When, however, a liquid such as the liquid 46 illustrated which is even reasonably conductive in character is placed within this container 16 so as to touch both of the electrodes 12 and 14 a current will flow from the power source 24 through the variable resistor 20. This signal will in turn be conducted to the transistor 32, permitting this transistor 32 to act as a switch or gate, allowing current to flow from the power source 24 through the meter 38.

The amount of current flowing through this meter 38 will depend on the amount of current conducted between the two electrodes 12 and 14 and this will of course depend upon the amount of immersion of the electrodes 12 and 14 and their spacing. Because of this when the device 10 is to be used solely with one liquid such as water the meter 38 may be calibrated so as to indicate or measure the level of the liquid 46 within this container 16.

In FIG. 2 of the drawing there is shown a closely related liquid measuring or indicating device 50. This device has a primary electrode 52 and a series of counter electrodes 54. All of these electrodes 52 and 54 should preferably be made out of electrically conductive material such as platinum or stainless steel which is inert with respect to a liquid with which the device 50 is ultimately to be used. They may be mounted in substantially the same manner as the electrodes 12 and 14. Preferably, the counter electrodes 54 are each of a different dimension so as to extend into an appropriate container 56 a different amount, the longest of these electrodes 54 extending into the container the same amount of the primary electrode 52.

The primary electrode 52 is connected by a line 58 to a variable resistor 60 corresponding to the resistor 20. The other terminal of the resistor 60 is connected by another line 62 to a power source 64 corresponding to the power source 24 which is grounded by a ground 66. In the device 50 each of the counter electrodes 54 is connected to a corresponding circuit section 68, and all of these circuit sections 68 are connected by wires 70 to the power source 64. If desired, however, the circuit sections 68 can be connected to another power source.

Since each of these circuit sections 68 is identical, the parts of all of them are designated by same numerals. Each of the circuit sections 68 include a conventional light bulb 72 serving as an indicator means and a transistor 74 serving as a current responsive switch having a terminal or collector 75 electrically connected to the light bulb 72 by a wire 76. The control terminal or base of each transistor 74 is electrically connected by a wire 80 to the corresponding counter electrodes 54. A common wire 82 electrically connects all of the output terminals or emitters 84 of all of the transistors 74 to a ground 88.

With the device 50 the primary electrodes 52 acts with respect to any one of the counter electrodes 54 in contact with an electrically conductive liquid 88 in the container 56 in substantially the same manner in which the primary electrode 12 functions with respect to the counter electrode 14 in the device 10. Thus, when the liquid 88 establishes conduction between the primary electrode 52 and any one of the counter electrodes 54 current is permitted to flow in the circuit section 68 corresponding to this counter electrode 54 by virtue of current being conducted to the control terminal 78. This in turn causes actuation of the corresponding light bulb 72 serving as an indicating means.

Because of the fact that the counter electrodes 54 are at different levels it is possible to determine with this device 50 the approximate level of a liquid such as the liquid 86 located within the container 56 by merely inspecting the various light bulbs 72. If all of these light bulbs 72 are illuminated, the liquid level is high. On the other hand, if none of them are illuminated, the liquid has not established conduction between the primary electrode 52 and any of the counter electrodes 54 and thus the container 56 is indicated as empty or substantially empty.

Devices corresponding to the device 50 have been satisfactorily tested under service conditions for use in measuring the level of common tap water. In one of such devices, the electrodes 52 and 54 were .030 diameter stainless steel wire; the gap between the primary electrode 52 and the next adjacent counter electrode 54 was .052 inch; and the gap between the various counter electrodes 54 was .010 inch. In this device, the resistor 60 was adjustable up to 1000 ohms; the transistors 74 were CA 2714 transistors; the lights were incandescent lamps capable of giving illumination, at a current flow of 60 milliamps at 14 volts; and the power source 64 was a common automtoive 12-volt battery. The particular device described here was capable of withstanding a great deal of physical abuse, and performed satisfactorily under service conditions so that remote readings could be obtained using the light bulb 72.

Figure 3:
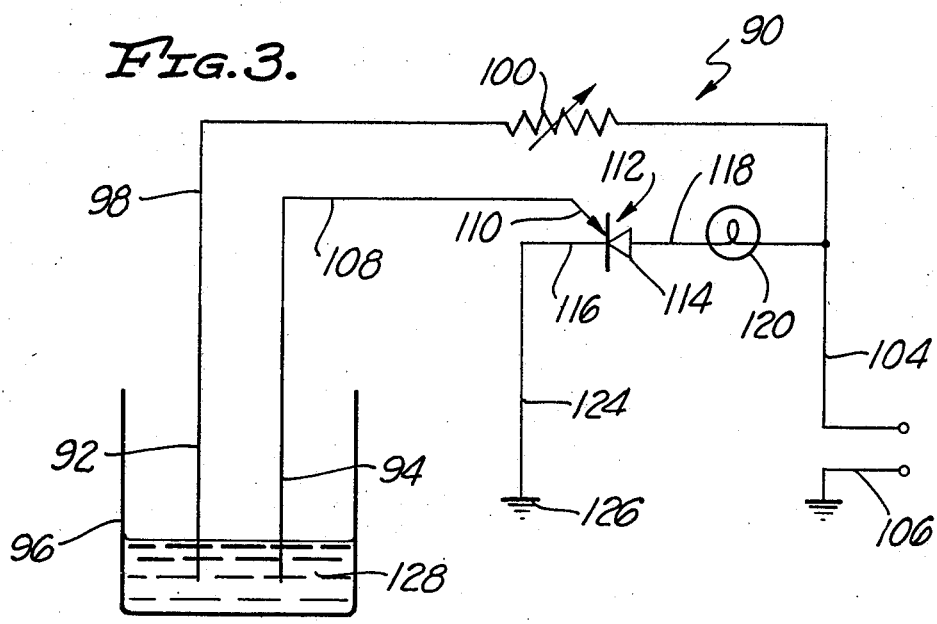
FIG. 3 is a schematic view of another embodiment or form of a liquid measuring or indicating device of this invention.

In FIG. 3 of the drawings there is shown another embodiment or form of a liquid indicating or measuring device 90 of this invention. This device 90 has a primary electrode 92 and a correspondingly dimensioned counter electrode 94. These electrodes correspond to the electrodes 12 and 14 previously described. They are preferably made out of a material which is inert with respect to a liquid with which the device 90 is ultimately to be used. These electrodes 92 and 94 may be mounted upon any convenient support (not shown) or may be directly immersed in a container 96 as indicated.

The electrode 92 is electrically connected by a line 98 to an appropriate variable resistor 100 corresponding to an used for the same purpose as the resistor 20 previously described. Another line electrically connects a terminal of this resistor 100 to an alternating current power source 104 corresponding to the power source 24. This power source 104 is grounded by a ground 106. The counter electrode 94 is electrically connected by another line 108 to a control terminal or electrode 110 of a signal or silicon controlled rectifier (SCR) 112. The power terminals 114 and 116 of this rectifier 112 are connected as shown so that the terminal 114 is electrically connected by a wire 118 to a light bulb 120 which is electrically connected by another wire 122 to the power source 104. The terminal 116 is electrically connected by a wire 124 to a ground 126.

With this structure, the bulb 120 serves as an indicator means, and the rectifier 112 serves as a current responsive switch means. The structure including the bulb 120 and the rectifier 112 and the appropriate connections may be considered as a "switch section." If desired the wire 122 may be connected to a different power source than the power source 104, but this is not normally considered desirable or necessary.

The operation of the device 90 is essentially similar to the operation of the device 10. When a liquid 128 is located within the container 96, electrical conduction is established between the electrodes 92 and 94. When this happens current will be conveyed from the power source 104 to the control terminal 110 of the rectifier 112. This in turn will allow the current to pass through the bulb 120 to the ground 126, causing the bulb to light up.

Still another embodiment of a device 130 of this invention is illustrated in FIG. 4 of the drawing. This device 130 is closely related to the device 90 described in the preceding description. It has a primary electrode 132 and a series of counter electrodes 134 located within a container 136. Preferably all of the electrodes should be made out of a conductive material such as platinum, stainless steel or the like which is inert with respect to any liquid with which the device 130 may be used. These electrodes 132 and 134 may be mounted in the same manner as the electrodes with the preceding embodiments or forms of the invention. Preferably the counter electrodes 134 should project into the container 136 to different depths as shown.

The primary electrode 132 is connected by a line 138 to a variable resistor 140 which is in turn connected by another line 142 to an alternating current power source 144. This power source 144 is grounded by a ground 146. Each of the counter electrodes 134 is connected to a corresponding circuit section 148. These circuit sections 148 are also connected to the same power source 144 by wires 150, although if desired, they may be connected to another power source.

The circuit sections 148 are all identical. Each includes a common light bulb 152 serving as an indicator means. Each also includes a signal or silicon controlled rectifier (SCR) 154 connected as shown by a wire 156 to the corresponding light bulb 152. Each of the rectifiers 154 serves as a current responsive switch and has a control terminal 158 connected by a wire 160 to its corresponding counter electrode 134. The bases 162 of the rectifiers 154 are all joined by wires 157 to a common ground 159.

It will be realized that within the device 130 the sections 148 correspond to the sections 68 in the device 50 and that in both of these devices the sections are in effect connected in parallel with respect to the power source used. The operation of the device 130 is essentially the same as the operation of the device 50 previously described. When electrical conduction is established between the primary electrode 132 and any one of the counter electrodes 134 by virtue of a conductive liquid 164 being within the container 136, power is supplied to the control terminal 158 corresponding to such electrode 134. This in turn permits current flow through the corresponding light bulb 152 by virtue of the operation of the corresponding rectifier 154. If all of the counter electrodes 134 are in electrical communication with the primary electrode 132, all of the light bulbs 152 then operate simultaneously. Depending upon the level of the liquid 164 within the container 136 none or various numbers of bulbs 152 will be operating.

From a careful consideration of the foregoing it will be realized that a number of changes may be made in the various embodiments of the device as shown without changing the essential operation of these devices. As an example of this, in the interest of brevity, conventional on-off switches have been omitted from the description of the various embodiments. Similarly no effort has been made to show how various parts of the devices described can be mounted remote from a container as may be desired for any particular installation. Various current responsive means, such as meters, solenoids, etc. can be substituted for the different indicator means described.

What is claimed is:

1. A device for indicating the level of liquid in a container comprising in combination,
    a source of electrical power,
    a primary electrode for insertion in the liquid, which electrode is connected in series with an adjustable resistance and said source of electrical power,
    a counter electrode for contacting the liquid and sensing an increase in the fluid level above the lower end of the primary electrode,
    a semi-conductor device having its power circuit electrically connected across said power supply in series with an electrical indicating device,
    said counter electrode is connected to the biasing terminal of said semi-conductor device to bias said semi-conductor device to the conducting condition when said fluid level contacts said counter electrode, whereby said series connected indicating device displays the level of the fluid,
    said electrodes each have a longitudinal length for insertion into said fluid,
    and said indicating device is a meter for displaying increases in current flow across said electrodes and through said circuit with changes in the level of the fluid and the immersion of adjacent ends of said electrodes.

References Cited

UNITED STATES PATENTS

| | | | |
|---|---|---|---|
| 1,049,592 | 1/1913 | Walton | 73—304 |
| 1,971,806 | 10/1934 | Bargeboer | 73—304 |
| 3,131,335 | 4/1964 | Berglund. | |
| 3,206,615 | 9/1965 | Lapointe. | |
| 3,368,404 | 2/1968 | King | 73—304 |

S. CLEMENT SWISHER, Primary Examiner

U.S. Cl. X.R.

340—244